US011438450B2

(12) United States Patent
Tetsuka et al.

(10) Patent No.: US 11,438,450 B2
(45) Date of Patent: Sep. 6, 2022

(54) INFORMATION TRANSMISSION APPARATUS AND INFORMATION TRANSMISSION METHOD

(71) Applicant: Honda Motor Co., Ltd., Tokyo (JP)

(72) Inventors: Takashi Tetsuka, Wako (JP); Atsushi Ito, Wako (JP); Nanami Tsukamoto, Wako (JP); Shinichiro Yamauchi, Wako (JP); Tomoko Shintani, Wako (JP); Tetsuya Yashiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/292,636

(22) PCT Filed: Nov. 5, 2019

(86) PCT No.: PCT/JP2019/043198
§ 371 (c)(1),
(2) Date: May 10, 2021

(87) PCT Pub. No.: WO2020/100647
PCT Pub. Date: May 22, 2020

(65) Prior Publication Data
US 2022/0014618 A1   Jan. 13, 2022

(30) Foreign Application Priority Data

Nov. 13, 2018 (JP) .............................. JP2018-213237

(51) Int. Cl.
*H04M 1/72448* (2021.01)
(52) U.S. Cl.
CPC .............. *H04M 1/72448* (2021.01)

(58) Field of Classification Search
CPC ................................................ H04M 1/72448
See application file for complete search history.

(56) References Cited

FOREIGN PATENT DOCUMENTS

| JP | 11-018145 | * | 1/1999 |
| JP | H1118145 A | | 1/1999 |
| JP | 2001217903 | * | 8/2001 |
| JP | 2001217903 A | | 8/2001 |
| JP | 2004020719 | * | 1/2004 |
| JP | 2004020719 A | | 1/2004 |

(Continued)

OTHER PUBLICATIONS

International Search Report; Application PCT/JP2019/043198; dated Dec. 10, 2019.

*Primary Examiner* — Ankur Jain
*Assistant Examiner* — Angelica M Perez
(74) *Attorney, Agent, or Firm* — Duft & Bornsen, PC

(57) ABSTRACT

An information transmission apparatus includes: a mode instruction unit configured to instruct a first mode to permit a voice output by the voice output unit or a second mode to prohibit the voice output; an image control unit configured to control a display image of a display unit so as to display an agent image including a face image of an agent; and an output determination unit configured to determine whether or not output of information to the user is necessary. The image control unit controls the display image so as to display, when the output determination unit determines output of information is necessary without being input a voice of an utterance by the user in a state where the second mode is instructed, a second agent image including a second face image.

9 Claims, 3 Drawing Sheets

(56) References Cited

FOREIGN PATENT DOCUMENTS

| | | | |
|---|---|---|---|
| JP | 2004180261 | * | 6/2004 |
| JP | 2004180261 A | | 6/2004 |
| JP | 2005196645 | * | 7/2005 |
| JP | 2005196645 A | | 7/2005 |

* cited by examiner

INFORMATION TRANSMISSION APPARATUS AND INFORMATION TRANSMISSION METHOD

CROSS-REFERENCE TO RELATED APPLICATION

This application is a National Stage of PCT international application Ser. No. PCT/JP2019/043198 filed on Nov. 5, 2019 which designates the United States, incorporated herein by reference, and which is based upon and claims the benefit of priority from Japanese Patent Application No. 2018-213237, filed on Nov. 13, 2018, the entire contents of which are incorporated herein by reference.

TECHNICAL FIELD

The present invention relates to an information transmission apparatus for transmitting an information to a user by a voice or display.

BACKGROUND ART

Conventionally, an apparatus is known to transmit an information to a user through an agent displayed on a screen (for example, see Patent Literature 1). The apparatus described in Patent Literature 1 present an information to the user by changing a behaver of the agent on the screen based on a response information of the user acquired by an utterance between the agent displayed on the screen and the user.

CITATION LIST

Patent Literature

Patent Literature 1: Japanese Unexamined Patent publication No. 2005-196645

DISCLOSURE OF INVENTION

Problems to be Solved by the Invention

Incidentally, there may be a situation where it is undesirable for the user to interact with the agent, but in the apparatus described in Patent Literature 1, it is difficult to appropriately transmit information to the user in such a situation.

Means for Solving Problem

An aspect of the present invention is an information transmission apparatus including: a voice output unit configured to output a voice; a display unit configured to display an image; a voice input unit to which a voice of an utterance by a user is input; a mode instruction unit configured to instruct a first mode to permit a voice output by the voice output unit or a second mode to prohibit the voice output; a voice control unit configured to control, when the first mode is instructed by the mode instruction unit, the voice output unit to output a voice corresponding to an utterance by the user input to the voice input unit; an image control unit configured to control a display image of the display unit so as to display an agent image including a face image of an agent; and an output determination unit configured to determine whether or not an output of an information to the user is necessary. The image control unit controls the display image so as to display, when a voice of an utterance by the user is input to the voice input unit in a state where the second mode is instructed by the mode instruction unit, a first agent image including a first face image, while display, when the output determination unit determines an output of an information is necessary without an input of a voice of an utterance by the user to the voice input unit in a state where the second mode is instructed by the mode instruction unit, a second agent image including a second face image of a different expression from the first face image.

Another aspect of the present invention is an information transmission method for transmit an information via a display unit. The method includes a computer performing: instructing a first mode to permit a voice output or a second mode to prohibit the voice output; outputting a voice corresponding to an utterance by a user when the first mode is instructed; controlling a display image of the display unit so as to display an agent image including a face image of an agent; and determining whether or not an output of an information to the user is necessary. The controlling includes controlling the display image so as to display, when a voice of an utterance by the user is input in a state where the second mode is instructed a first agent image including a first face image, while display, when the output determination unit determines an output of an information is necessary without an input of a voice of an utterance by the user to a voice input unit in a state where the second mode is instructed, a second agent image including a second face image of a different expression from the first face image.

Effect of the Invention

According to the present invention, it becomes possible to appropriately transmit an information to a user through displaying an agent image in a situation where it is not desirable to interact with the user.

DESCRIPTION OF EMBODIMENT

Figure 1:
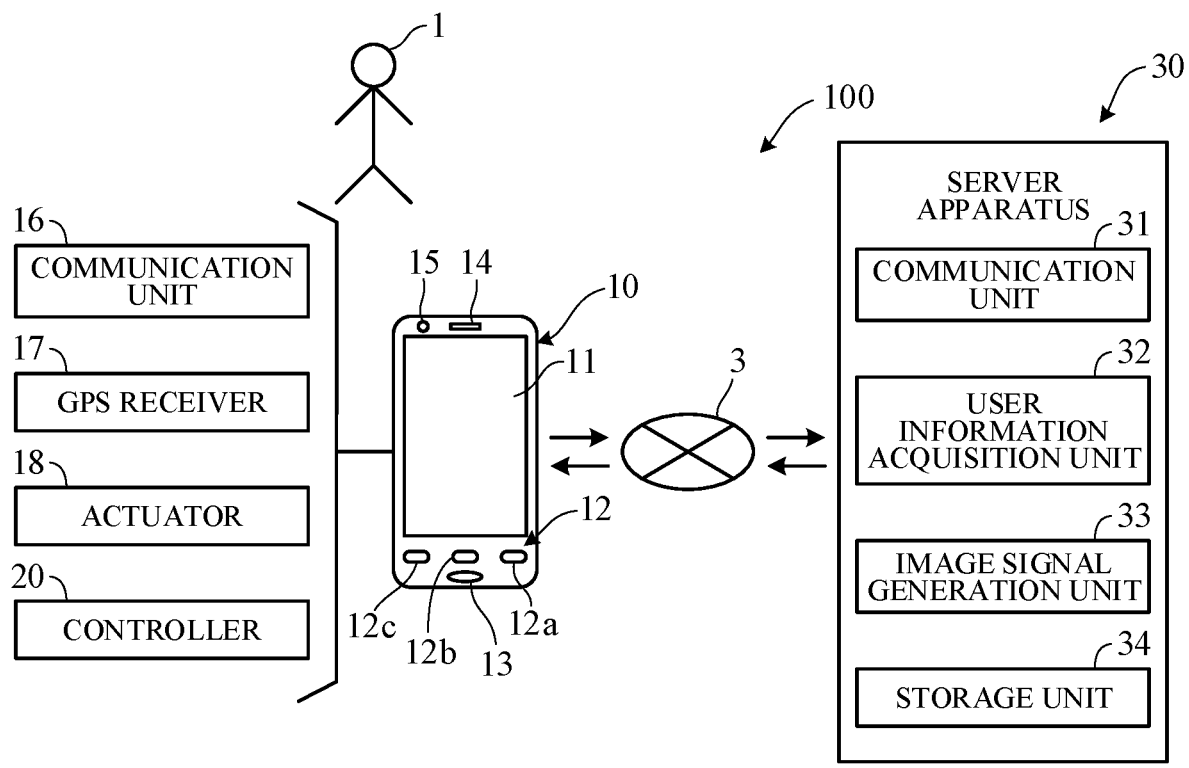
FIG. 1 is a diagram schematically showing a configuration of an information transmission apparatus according to an embodiment of the present invention.

Hereinafter, an embodiment of the present invention will be described with reference to FIGS. 1 to 5. FIG. 1 is a diagram showing a schematic configuration of an information transmission system 100 including an information transmission apparatus according to the embodiment of the present invention. As shown in FIG. 1, the information transmission system 100 includes a user terminal 10 carried by a user 1 and a server apparatus 30.

The user terminal 10 and the server apparatus 30 are connected to a network 3 including public wireless communication networks represented by the Internet, a mobile telephone network, and the like, and can communicate with each other via the network 3. Note that the network 3 also includes a closed communication network provided for each predetermined management area, such as a wireless LAN or Wi-Fi (registered trademark), for example.

The user terminal 10 is configured with any type of mobile terminal that has a display unit such as a monitor or a display and is carried and used by the user 1, such as a smartphone, a tablet terminal, a mobile phone, or a wearable terminal. FIG. 1 shows an example in which the user terminal 10 is configured with a smartphone having a telephone function formed in a thin and substantially rectangular shape as a whole. The user terminal 10 is a terminal unique to a user. An ID (user ID) associated with the user 1 who utilizes the information transmission system 100 is granted to the user terminal 10.

The user terminal 10 has a display 11, a button group 12, a microphone 13, a speaker 14, a camera 15, a communication unit 16, a GPS receiver 17, an actuator 18, and a controller 20.

The display 11 includes a display device such as a liquid crystal display, an organic EL display, or an inorganic EL display. The display 11 has a substantially rectangular shape as a whole, and displays various images such as letters, symbols, and graphics. The display 11 is configured with, for example, a touch panel, and functions also as an input unit for inputting various information. Note that a position and the shape of the display 11 are not limited to those shown in FIG. 1.

The button group 12 includes a plurality of buttons 12a to 12c operated by the user 1. Various commands are input in response to the operation of the buttons 12a to 12c. One of the buttons (for example, the button 12a) is configured as a silent mode button for a command of a silent mode and a cancellation thereof, for example. Note that the number, shapes, and positions of the buttons constituting the button group 12 are not limited to those described above.

The microphone 13 constitutes a voice input unit that acquires an utterance by the user 1 as a voice signal. The signal acquired by the microphone 13 is input to the controller 20 as voice data through an A/D converter, for example.

The speaker 14 constitutes a voice output unit that converts a voice signal transmitted from the controller 20 into a voice to output it. The speaker 14 outputs a voice of an intended party during a call. The speaker 14 can also output various voice messages, ringtones, music, and the like.

The camera 15 is an in-camera that has an imaging element such as a CCD or a CMOS sensor, and captures a person or an object facing the display 11. A back camera may be provided on a back side of the display 11. Note that positions and the number of the cameras 15 are not limited to those described above.

The communication unit 16 performs wireless communication via the network 3. The communication can also be performed without using the network 3.

The GPS receiver 17 receives positioning signals from a plurality of GPS satellites, and measures an absolute position (latitude, longitude, etc.) of the user terminal 10 based on the received positioning signals.

The actuator 18 is configured with a vibrator or the like that applies vibration to a housing of the user terminal 10. The actuator 18 works when it is necessary to notify the user 1 that there has been an incoming call or mail in a silent mode, for example.

The controller 20 includes a microcomputer including a calculation unit such as a CPU as an operational circuit, a storage unit such as a ROM and a RAM, and another peripheral circuit (an interface circuit, etc.). A functional configuration of the controller 20 will be described later.

The server apparatus 30 has, as a functional configuration, a communication unit 31, a user information acquisition unit 32, an image signal generation unit 33, and a storage unit 34.

The communication unit 31 communicates with the user terminal 10 via the network 3. The user information acquisition unit 32 acquires user information from the user terminal 10. The acquired information is stored in the storage unit 34 in association with the user ID. The user information includes preference information of the user 1, such as a hobby and a food preference. The preference information is information unique to a user. The preference information corresponding to each user 1 is determined based on, for example, a keyword included in a voice uttered by the user 1, a voice output to the user 1, and the like, input information input from the touch panel (the display 11), and output information displayed on the display 11.

The image signal generation unit 33 determines an avatar image (see FIG. 2) corresponding to each user 1, and generates an image signal corresponding to the avatar image. In this case, a personality of the user 1 is first quantified based on the user information stored in the storage unit 34. For example, for each of personality parameters of the user 1, such as activity, sociability, cooperativeness, and consideration, a degree thereof (a degree of activity, a degree of sociability, etc.) is numerically expressed. Then, an avatar image to be displayed on the display 11 is determined in view of distribution of the numerical values of the personality parameters, and an image signal corresponding to that avatar image is generated. The generated image signal is transmitted through the communication unit 31 to the corresponding user terminal 10.

Figure 2:
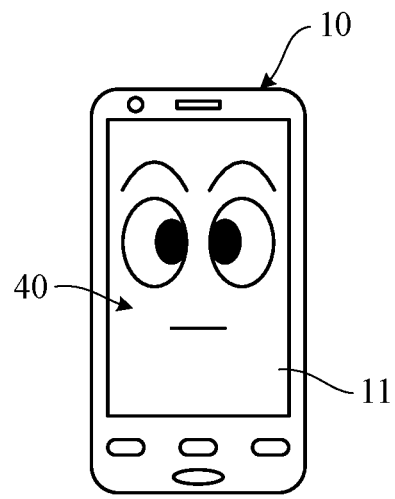
FIG. 2 is a diagram showing an avatar image displayed on the user terminal of FIG. 1.

FIG. 2 is a diagram showing an example of an avatar image 40 displayed on the display 11. The avatar image 40 is an image of an avatar personified as an alter ego of the user 1, and is expressed in a form of a predetermined character or agent. Specifically, in the present embodiment, the avatar image 40 is expressed as a face image of a character. More specifically, the avatar image 40 is displayed in a form representing eyes, eyebrows, and a mouth of the character.

The avatar image 40 is an image that is unique to a user, that varies by user, and that represents the form of the avatar well reflecting the personality of the user 1 as the alter ego of the user 1. This causes the user 1 to easily feel a sense of affinity toward the avatar image 40. In the present embodiment, the avatar image 40 of the specific user 1 changes depending on a usage state of the user terminal 10. Note that the user 1 may set the form of the avatar image 40 according to user's preference through the user terminal 10.

Figure 3:
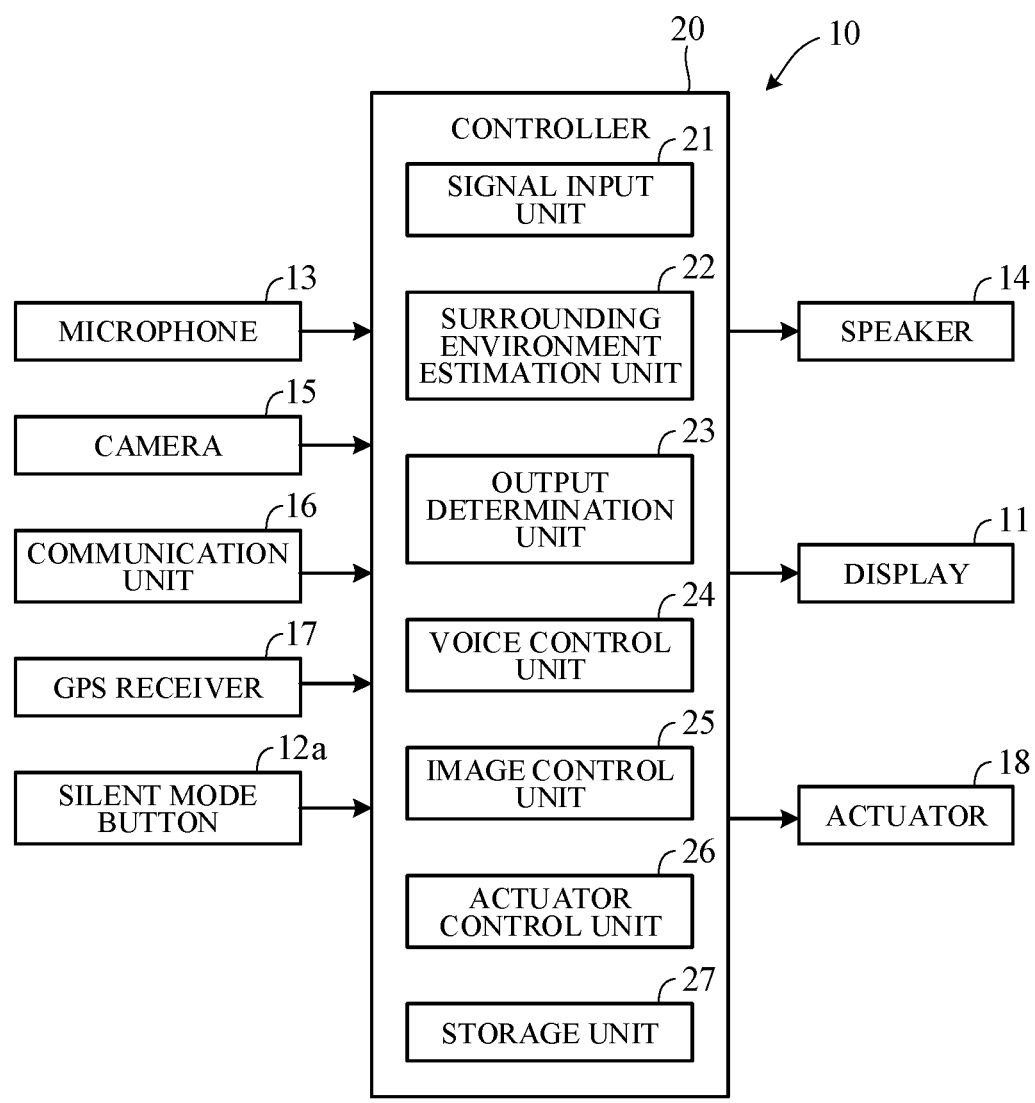
FIG. 3 is a block diagram showing a control configuration of the information transmission apparatus according to an embodiment of the present invention.

FIG. 3 is a block diagram showing a control configuration of the user terminal 10 as an information transmission apparatus according to the present embodiment. As shown in FIG. 3, the controller 20 receives input signals from the microphone 13, the camera 15, the communication unit 16, the GPS receiver 17, and the silent mode button 12a. The CPU of the controller 20 executes a predetermined process based on these input signals, and outputs control signals to the speaker 14, the display 11, and the actuator 18.

The controller 20 has, as a functional configuration, a signal input unit 21, a surrounding environment estimation unit 22, an output determination unit 23, a voice control unit 24, an image control unit 25, an actuator control unit 26, and a storage unit 27.

The signal input unit 21 inputs signals from the microphone 13, the camera 15, the GPS receiver 17, and the silent mode button 12a, as well as a signal received through the communication unit 16 from the server apparatus 30, for example, the image signal corresponding to the avatar image 40 transmitted from the server apparatus 30.

The surrounding environment estimation unit 22 estimates a surrounding environment of the user terminal 10 based on a signal from the GPS receiver 17. This estimation is used to determine whether outputting a voice from the speaker 14 is appropriate, that is, whether the user 1 is in an environment where the user terminal 10 is to be set to the silent mode. The surrounding environment estimation unit 22 can also estimate the surrounding environment based on signals acquired by the microphone 13 and the camera 15.

The output determination unit 23 determines whether notifying the user 1 of information is necessary. For example, when there is an incoming call or mail to the user terminal 10 through the communication unit 16 or when there is a push notification from various servers to the user terminal 10 through the communication unit 16, it is determined that notifying the user 1 of that is necessary.

The voice control unit 24 determines whether the silent mode command is in effect by the operation of the silent mode button 12a. When the silent mode is enabled (in the silent mode), voice output from the speaker 14 is prohibited even when the output determination unit 23 determines that notifying the user 1 of information is necessary. Thus, no voice is output from the speaker 14 even when there is an incoming call, for example. On the other hand, when the silent mode is off (in the non-silent mode), voice output from the speaker 14 is permitted. Thus, a voice (a ringtone) is output from the speaker 14 when there is an incoming call, for example.

Further, the voice control unit 24 determines whether the user terminal 10 is to be turned to the silent mode based on the surrounding environment estimated by the surrounding environment estimation unit 22 and the user information stored in the storage unit 27, regardless of whether the silent mode button 12a is operated. When it is determined that the user terminal 10 is to be turned to the silent mode, the user terminal 10 is automatically set to the silent mode. The voice control unit 24 may determine whether the silent mode is to be canceled depending on the surrounding environment estimated by the surrounding environment estimation unit 22 and the user information. When it is determined that the silent mode is to be canceled, the silent mode may be automatically cancelled.

Further, the voice control unit 24 can also make, in the non-silent mode, the speaker 14 output a voice including an answer or a proposal to a question of the user 1, a further question to an answer of the user 1, or the like. That is, the voice can be output like interacting with the user 1. In this case, the voice control unit 24 recognizes a voice signal input to the microphone 13 from the user 1 by referring to words registered in a dictionary database (not shown) of the storage unit 27. For example, the question or the answer to the user terminal 10 in utterances by the user 1 is recognized. Next, a response content corresponding to a recognized voice content is extracted from a dialog database (not shown) of the storage unit 27, and a response message is generated. At this time, information is narrowed down based on the user information (preference information, etc.) stored in the storage unit 27, and the response message including the narrowed down information is generated. Then the speaker 14 is controlled to output a voice corresponding to the response message. By the way, the voice signal from the user 1 may be transmitted to the server apparatus 30, the server apparatus 30 may generate a response message in view of the preference information of the user 1, then the user terminal 10 may receive this response message to output it from the speaker 14.

Further, the voice control unit 24 determines whether the user 1 asks a question to the user terminal 10 based on signals acquired by the microphone 13 and the camera 15 in the silent mode. More specifically, the voice control unit 24 refers to the dictionary database of the storage unit 27 to specify a word corresponding to a voice signal input from the user 1, and determines whether the specified word is applicable to one of a plurality of question words registered in the dictionary database in advance, thereby determining whether a question is asked. When it is determined that the user 1 asks a question, a response voice to the question is output from the speaker 14 even in the silent mode. In this case, the silent mode is temporarily canceled, and only the response voice to the question is output from the speaker 14. Note that, instead of being temporarily canceled, the silent mode may be canceled in the same way as when the silent mode button 12a is operated.

The image control unit 25 controls a display image of the display 11. For example, a control signal is output to the display 11 to display the avatar image 40 corresponding to the image signal transmitted from the server apparatus 30. The avatar image 40 is an image corresponding to the personality of the user 1, and has a look (expression) that changes depending on the usage state of the user terminal 10.

Figure 4:
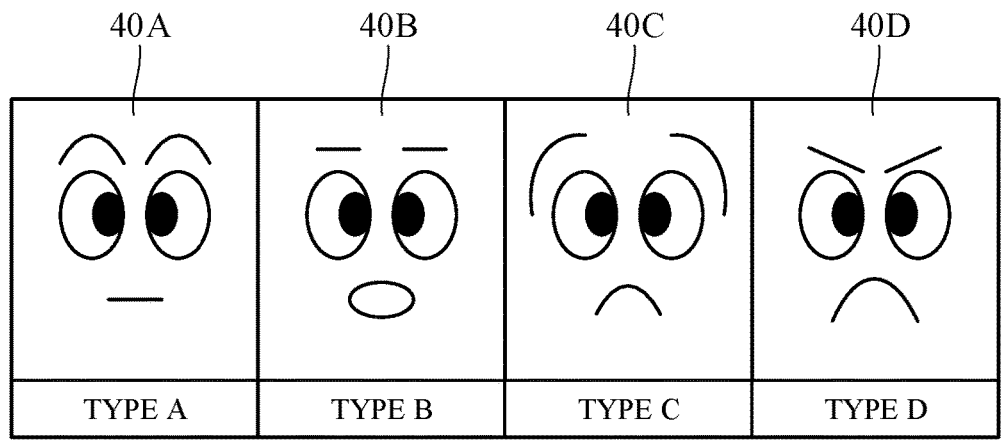
FIG. 4 is a diagram showing change in a look of the avatar image displayed on the user terminal of FIG. 1.

FIG. 4 is a diagram showing an example of changes in the look of the avatar image 40 displayed on the display 11. FIG. 4 shows four avatar images 40 (40A to 40D) having looks of types A to D, respectively. The avatar image 40A of the type A is, for example, an image when the user terminal 10 is in a waiting state, that is, an image in a normal state. The avatar image 40A is expressed by a standard look in an ordinary state.

The avatar image 40B of the type B is, for example, an image when the avatar emits a voice representing a ringtone (for example, a voice such as "ring ring") to the user 1 in the non-silent mode (the normal mode) in which the silent mode is off, and has a mouth that moves in synchronization with the voice being emitted from the speaker 14. The avatar image 40B of the type B is displayed when a voice is output from the speaker 14 in response to a question from the user 1 in the silent mode as well as in the non-silent mode.

The avatar image 40C of the type C is, for example, an image displayed when the user 1 is notified that there has been an incoming call or mail in the silent mode. The avatar image 40C is the image having a perplexed look since outputting a voice is prohibited although there is information to be conveyed to the user 1.

Assuming that a plurality of users 1 are a first user 1A and a second user 1B and have unique user terminals 10A and 10B, respectively, the avatar images 40 displayed on the user terminals 10A and 10B are different from each other. For example, the avatar image 40C of the type C is an image of an avatar displayed on the user terminal 10A of the first user 1A. Meanwhile, the avatar image 40D of the type D is an image of an avatar displayed on the user terminal 10B of the second user 1B in the same state as when the type C is displayed. The avatar image 40D of the type D is different from the avatar image 40C of the type C, and is expressed by the image having an angry look.

Forms of the avatar image 40C of the type C and the avatar image 40D of the type D (the looks of the images) are different from each other since personalities of the users 1A and 1B are different from each other. That is, the image signal generation unit 33 of the server apparatus 30 generates image signals in view of the personalities of the users 1A and 1B. Thus, even if the user terminals 10A and 10B are in the same usage state (for example, in the silent mode) and have the avatar images 40 in the same type (having a face image of the same character), the looks of the avatar images 40 displayed on the user terminals 10A and 10B are different from each other.

This allows for effectively notifying each of the users 1A and 1B that there has been an incoming call or mail in the silent mode. That is, the avatar image 40C is displayed for the user 1A whom the perplexed look is more likely to reach, and the avatar image 40D is displayed for the user 1B whom the angry look is more likely to reach, so that information can be well transmitted to the users 1A and 1B by image display.

The actuator control unit 26 outputs a control signal to the actuator 18 to vibrate the user terminal 10 when the output determination unit 23 determines that notifying the user 1 of information is necessary in the silent mode. This causes the user 1 to be able to easily notice that there has been an incoming call or the like. The actuator 18 may be always in an off state by changing a setting of the user terminal 10. Further, the actuator 18 may work simultaneously with a ringtone output in the non-silent mode.

Figure 5:
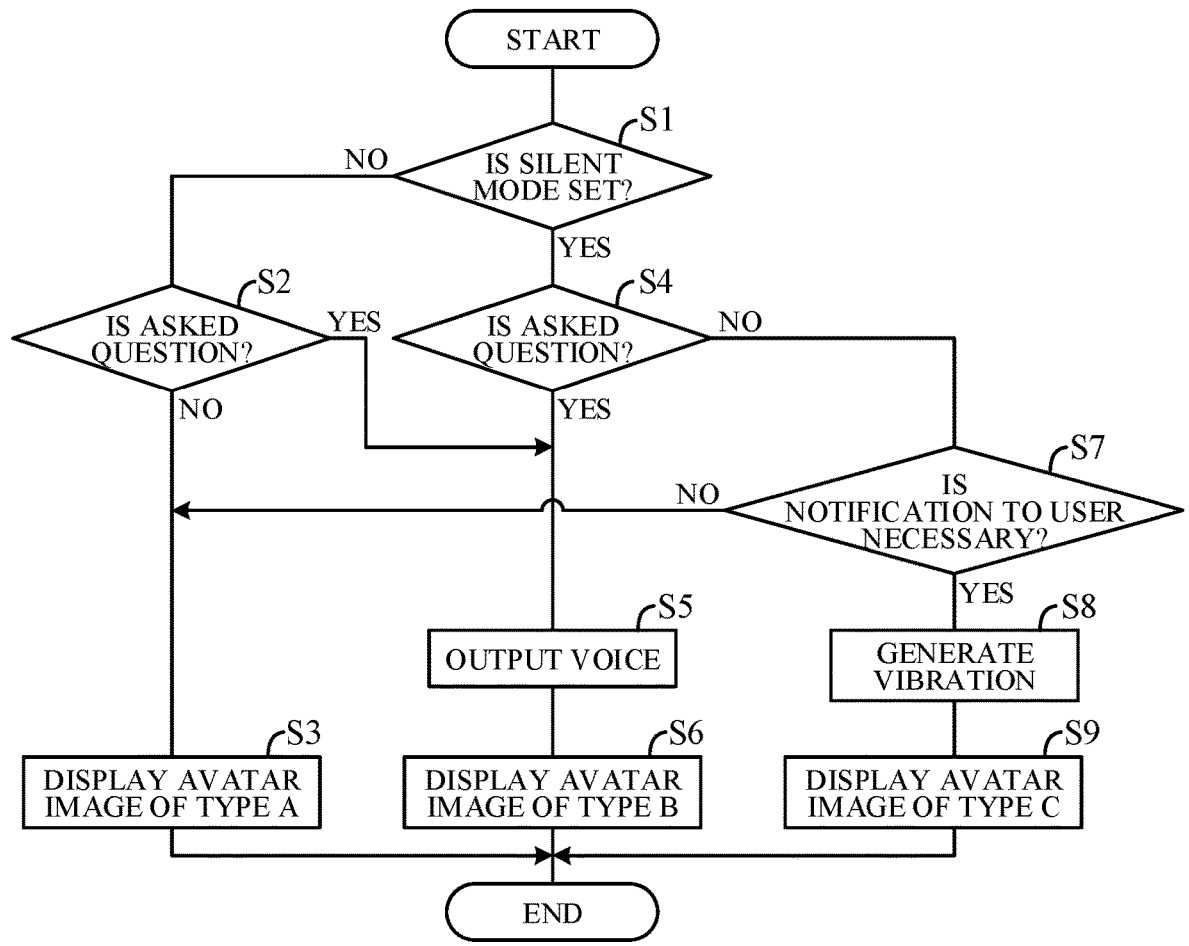
FIG. 5 is a flowchart showing an exemplary operation performed by the controller of FIG. 3.

FIG. 5 is a flowchart showing an example of a process executed by the CPU of the controller 20 according to a program stored in the storage unit 27 of FIG. 3 in advance. The process shown in this flowchart is started, for example, by turning on the user terminal 10, and is repeated at a predetermined cycle. Upon being turned on, the user terminal 10 starts communication with the server apparatus 30. The server apparatus 30 determines a plurality of avatar images 40 corresponding to the user ID (for example, the avatar images 40A to 40C corresponding to the first user 1A), and transmits image signals corresponding to the plurality of avatar images 40 to the user terminal 10. The user terminal 10 starts the process of FIG. 5 with these image signals stored in the storage unit 27.

First, in step S1, it is determined whether or not the user terminal 10 is set to the silent mode manually by operating the silent mode button 12a or automatically depending on the surrounding environment. If NO in step S1, the process proceeds to step S2, in which it is determined, based on signals acquired by the microphone 13 and the camera 15, whether the user 1 asks a question to the user terminal 10. If YES in step S2, the process proceeds to step S5, and if NO, the process proceeds to step S3. In step S3, a control signal is output to the display 11 to display on the display 11, for example, the avatar image 40A of the type A in FIG. 4.

On the other hand, if YES in step S1, the process proceeds to step S4, in which it is determined as in step S2, based on the signals acquired by the microphone 13 and the camera 15, whether the user 1 asks a question to the user terminal 10. If YES in step S4, the process proceeds to step S5, in which a control signal is output to the speaker 14 to output from the speaker 14 a voice in response to the question. Next, in step S6, a control signal is output to the display 11 to display on the display 11, for example, the avatar image 40B of the type B in FIG. 4.

On the other hand, if NO in step S4, the process proceeds to step S7, in which it is determined, based on a signal received through the communication unit 16, whether notifying (transmission to) the user terminal 10 of information indicating an incoming call or the like is necessary, that is, whether notification to the user 1 is necessary. If NO in step S7, the process proceeds to step S3, in which, for example, the avatar image 40A of the type A is displayed on the display 11. Note that the avatar image 40 of a type other than the types A to C may be displayed.

If YES in step S7, the process proceeds to step S8, in which a control signal is output to the actuator 18 to vibrate the user terminal 10. This causes the user 1 to be able to recognize that there has been an incoming call. Next, in step S9, a control signal is output to the display 11 to display on the display 11, for example, the avatar image 40C of the type C in FIG. 4. This causes the user 1 to be able to recognize that there has been an incoming call or the like also by image display. In this case, the information is transmitted to the user 1 not by letters or symbols but by a change in the look of the avatar image 40, and thus the user 1 can receive comfortable service from the user terminal 10 and obtain high satisfaction for the use of the user terminal 10.

According to the present embodiment, following functions and effects can be obtained.

(1) A user terminal 10 as an information transmission apparatus includes a speaker 14 configured to output a voice, a display 11 configured to display an image, a microphone 13 to which a voice of an utterance by a user 1 is input, a voice control unit 24 configured to issue, in response to a signal from a silent mode button 12a or the like, a command of a normal mode (a non-silent mode) for permitting voice output from the speaker 14 or a command of a silent mode for prohibiting voice output and to control the speaker 14 to make the speaker 14 output a voice corresponding to the utterance by the user 1 input to the microphone 13 when the command of the non-silent mode is in effect, an image control unit 25 configured to control a display image of the display 11 so that an avatar image 40 including a face image of an agent (an avatar) is displayed, and an output determination unit 23 configured to determine whether outputting information to the user 1 is necessary (FIG. 3). The image control unit 25 controls the display image so that, when the voice of the utterance by the user 1 (for example, the voice of a question to the user terminal 10) is input to the microphone 13 during the command of the silent mode in effect by the voice control unit 24, for example, an avatar image 40B having a look of a type B in FIG. 4 is displayed, while when no voice of utterances by the user 1 is input to the microphone 13 but the output determination unit 23 determines that outputting information is necessary during the command of the silent mode in effect by the voice control unit 24, for example, an avatar image 40C having a look of a type C in FIG. 4 is displayed (FIG. 5).

Thus, a mode of the avatar image 40 (the look of the image) changes when the user 1 asks a question in the silent mode and when the user 1 asks no question but notifying the user 1 that there has been an incoming call or the like is necessary. Therefore, it is possible to appropriately convey to the user 1 that there has been an incoming call or the like in the silent mode without outputting a voice from the speaker 14. That is, the change in the look is suitable for expressing a feeling of the avatar, and conveying the change in the feeling of the avatar to the user 1 causes the user 1 to be able to recognize easily and accurately, for example, that there is a notification of urgency. Further, the user 1 can interact with the avatar through the user terminal 10 and feels a sense of affinity toward the avatar. The user 1 is then notified by using that avatar image 40, and thus feels more comfortable.

(2) The user terminal 10 as the information transmission apparatus further includes a storage unit 27 that stores user information including preference information of the user 1 (FIG. 3). The voice control unit 24 controls the speaker 14 so that, when the voice of the utterance by the user is input to the microphone 13 even in the silent mode, the voice corresponding to the utterance by the user 1 input to the microphone 13 is output based on the stored user information. A voice output in the silent mode may surprise the user 1. However, in the present embodiment, the voice is output in the silent mode when the user 1 asks a question, allowing the voice output not to surprise the user 1.

(3) The avatar images 40B and 40C are images unique to the user 1 based on the stored user information. Therefore, different avatar images (40C and 40D in FIG. 4, for example) are respectively displayed for users 1A and 1B of different personalities, resulting in further enhanced affinity of the user 1 to the avatar.

(4) The user terminal 10 as the information transmission apparatus further includes a surrounding environment estimation unit 22 configured to estimate a surrounding environment (FIG. 3). The voice control unit 24 issues a command to permit or prohibit voice output based on the stored user information and the surrounding environment estimated by the surrounding environment estimation unit 22. This allows the user terminal 10 to be automatically set to the silent mode without operating the silent mode button 12a, so that no voice of utterances is output through the avatar image 40 in a situation where voice output is unsuitable.

(5) The user terminal 10 as the information transmission apparatus further includes an actuator 18 that generates vibration and an actuator control unit 26 configured to control the actuator 18 so that the vibration is generated when the output determination unit 23 determines that outputting information is necessary in the silent mode (FIG. 3). This causes the user 1 to be able to easily recognize that there has been an incoming call or the like in the silent mode.

(6) The information transmission method according to the present embodiment is an information transmission method for transmitting information via the display 11, and includes the computer (controller 20) performing: instructing a non-silent mode for permitting voice output or a silent mode for prohibiting voice output (step S1); controlling, when the non-silent mode is instructed, the speaker 14 so as to output voice corresponding to the utterance by the user 1 (step S5); controlling the display image of the display 11 so that the avatar image 40 including the face image of an agent is displayed (steps S3, S6, S9); and determining the necessity of output of information to the user 1 (step S7). The controlling the display image includes controlling the display image so that, when the silent mode is permitted, the avatar image 40B of the type B is displayed when the voice of the utterance by the user 1 is input, while controlling the display image so that, when the silent mode is instructed, the avatar image 40C of the type C is displayed when the voice of the utterance by the user 1 is not input and the output of the information is determined to be necessary (FIG. 5). In this way, it is possible to accurately transmit information such as an incoming call to the user 1 in the silent mode through a change in the display (expression) of the avatar image 40.

In the above embodiment, the voice control unit 24 instructs the non-silent mode (first mode) permitting the voice output or the silent mode (second mode) prohibiting the voice output based on the operation of the silent mode button 12a or the surrounding environment estimated by the surrounding environment estimation unit 22 and the user information, but the configuration of the mode instruction unit is not limited to this. The first mode or the second mode may be commanded based only on the surrounding environment estimated by the surrounding environment estimation unit 22. The configuration of the speaker 14 as a voice output unit for outputting voice, the configuration of the display 11 as a display unit for displaying an image, and the configuration of the microphone 13 as a voice input unit to which a voice of an utterance by the user 1 is input may be any configuration.

In the above embodiment, the output determination unit 23 determines that output of information to the user 1 is necessary when there is an incoming call or mail, but the configuration of the output determination unit is not limited to this. For example, even when an emergency alarm or the like is received, it may be determined that output of information to the user is necessary. Instead of determining that the information must be output to the user 1 whenever there is an incoming call of telephone, mail or the like, it may be determined that output of information is necessary according to the opposite party of the telephone or mail partner. When a message from the opposite party is recorded after receiving a call, it may be determined that output of information is necessary. The controller 20 may determine whether or not the highly urgent information has been received from the recorded message or the contents of the mail, and may determine that output of information is necessary when the highly urgent information is received.

In the above-described embodiment, the user information including the preference information of the user 1 is stored in storage unit 27 of the user terminal 10 and storage unit 34 of server apparatus 30, but the configuration of the user information memory unit may be stored only in the storage unit 27 of the user terminal 10, and the configuration of the user information is not limited to that described above. In the above embodiment, the speaker 14 is controlled so as to output the voice corresponding to the utterance by the user 1 input to the microphone 13 based on the user information, but the configuration of the voice control unit is not limited to that described above.

In the above embodiment, the avatar image 40 is displayed as an example of the agent image including the face image of the agent in response to a command from the image control unit 25. More specifically, when the voice (the voice of a question to the user terminal 10) generated by the utterance of the user 1 is input in the silent mode, the avatar image 40B of the type B is displayed as the first agent image including the first face image, and when it is determined that the output of the information to the user 1 is necessary without input of the voice generated by the utterance of the user 1 in the silent mode, the avatar image 40C of the type C is displayed as the second agent image including the second face image. Further, when it is determined that the output of the information to the user 1 is unnecessary without input of the voice generated by the utterance of the user 1 in the silent mode, the avatar image 40A of the type A is displayed as the third agent image including the third face image. However, the first face image, the second face image of the facial expression different from the first face image, and the third face image of the facial expression different from the first face image and the second face image may have any form. In addition to a face image, an image representing the morphology of the body may be displayed as a first agent image, a second agent image, and a third agent image. The third agent image is the same image as the avatar image 40A in the normal mode, but the third agent image may differ from the avatar image 40A. In the above embodiment, the same avatar image 40B is displayed in the case of interacting with the avatar in the silent mode and the case of interacting with the avatar in the non-silent mode, but the avatar images 40 that differ from each other may be displayed. Therefore, the configuration of the image control unit is not limited to that described above.

In the above embodiment, the actuator (vibration actuator) 18 for vibration is activated when an incoming call or the like is received in the silent mode, but the configuration of actuator control unit 26 is not limited thereto. a vibration actuator and an actuator control unit can also be omitted. In the above embodiment, the information transmission system 100 is configured by the user terminal 10 and server apparatus 30, but the function of server apparatus 30 may be provided in the user terminal 10, and server apparatus 30 may be omitted. An information transmission system can be configured by the user terminal alone.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 10 user terminal, 11 display, 12a silent mode button, 13 microphone, 14 speaker, 16 communication unit, 18 actuator, 20 controller, 22 surrounding environment estimation unit, 23 output determination unit, 24 voice control unit, 25 image control unit, 26 actuator control unit, 27 storage unit, 30 server apparatus, user information acquisition unit, 33 image signal generation unit, 34 storage unit, 100 information transmission system.

The invention claimed is:

1. An information transmission apparatus comprising:
a voice output unit configured to output a voice;
a display unit configured to display an image;
a voice input unit to which a voice of an utterance by a user is input; and
a microcomputer and a memory coupled to the microcomputer, wherein
the microcomputer and the memory are configured to perform:
instructing a first mode to permit a voice output by the voice output unit or a second mode to prohibit the voice output;
controlling, when the first mode is instructed, the voice output unit to output the voice of the utterance by the user input to the voice input unit;
controlling a display image of the display unit so as to display an agent image including a face image of an agent; and
determining whether or not an output of information to the user is necessary, wherein the controlling the display image includes controlling the display image so as to display, when the voice of the utterance by the user is input to the voice input unit in a state where the second mode is instructed, a first agent image including a first face image, while displaying, when determining the output of information is necessary without an input of the voice of the utterance by the user to the voice input unit in a state where the second mode is instructed, a second agent image including a second face image of a different expression from the first face image.

2. The information transmission apparatus according to claim 1, wherein
the memory stores user information including preference information of the user,
the microcomputer and the memory are configured to perform
the controlling the voice output unit by controlling, when the voice of the utterance by the user is input by the voice input unit, the voice output unit based on the user information stored in the memory so as to output a voice corresponding to the voice of the utterance by the user input to the voice input unit even if the second mode is instructed.

3. The information transmission apparatus according to claim 2, wherein
the first agent image and the second agent image are images specific to the user based on the user information stored in the memory.

4. The information transmission apparatus according to claim 2, wherein
the microcomputer and the memory are configured to further perform
estimating a surrounding environment, wherein
the instructing includes instructing the first mode or the second mode based on the user information stored in the memory and the surrounding environment estimated in the estimating.

5. The information transmission apparatus according to claim 1 further comprising:
a vibration actuator; wherein
the microcomputer and the memory are configured to further perform
controlling the vibration actuator so as to generate a vibration when determining the output of information is necessary in a state where the second mode is instructed.

6. The information transmission apparatus according to claim 1 further comprising
a communication unit configured to perform communication; wherein
the determining includes determining whether or not the output of information to the user is necessary based on a signal received through the communication unit in a state where the second mode is instructed.

7. The information transmission apparatus according to claim 6, wherein
the determining includes determining the output of information to the user is necessary when there is an incoming call through the communication unit in a state where the second mode is instructed.

8. The information transmission apparatus according to claim 7 further comprising a telephone function, wherein
the determining includes determining the output of information to the user is necessary when there is an incoming call of a telephone through the communication unit and a message from an opposite party of the incoming call is recorded after receiving the incoming call in a state where the second mode is instructed.

9. An information transmission method for transmitting information via a display unit, the method comprising a computer performing:
instructing a first mode to permit a voice output or a second mode to prohibit the voice output;
outputting a voice of an utterance by a user when the first mode is instructed;
controlling a display image of the display unit so as to display an agent image including a face image of an agent; and
determining whether or not an output of information to the user is necessary, wherein the controlling includes controlling the display image so as to display, when the voice of the utterance by the user is input in a state where the second mode is instructed, a first agent image including a first face image, while displaying, when the output of information is determined to be necessary without an input of the voice of the utterance by the user is input in a state where the second mode is instructed, a second agent image including a second face image of a different expression from the first face image.

* * * * *